(12) United States Patent
Fontana et al.

(10) Patent No.: US 6,611,847 B1
(45) Date of Patent: Aug. 26, 2003

(54) METHOD FOR DYNAMICALLY LINKING TWO OBJECTS IN TWO DIFFERENT MODELS

(75) Inventors: James Albert Fontana, Mission Viejo, CA (US); Ronald Jay Neubauer, Thousand Oaks, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/475,800

(22) Filed: Dec. 30, 1999

(51) Int. Cl.[7] .............................................. G06F 17/30
(52) U.S. Cl. ............................... 707/201; 707/3; 707/10
(58) Field of Search .............................. 707/9, 10, 100, 707/101, 201, 102, 202, 103, 203, 200, 205; 709/218, 219; 717/1, 4, 5

(56) References Cited

U.S. PATENT DOCUMENTS

| 5,557,793 | A | * | 9/1996 | Koerber ...................... 395/600 |
| 5,581,755 | A | * | 12/1996 | Koerber et al. ............. 395/614 |
| 5,689,701 | A | * | 11/1997 | Ault et al. ................... 395/610 |
| 5,692,180 | A | * | 11/1997 | Lee ............................. 395/610 |
| 5,832,274 | A | * | 11/1998 | Cutler et al. ................ 395/712 |
| 5,905,890 | A | * | 5/1999 | Seaman et al. ............. 395/704 |
| 5,937,406 | A | * | 8/1999 | Balabine et al. ............ 707/100 |
| 6,061,743 | A | * | 5/2000 | Thatcher et al. ............ 709/302 |
| 6,167,253 | A | * | 12/2000 | Farris et al. ................. 455/412 |
| 6,182,158 | B1 | * | 1/2001 | Kougiouris et al. ........ 709/328 |
| 6,256,031 | B1 | * | 7/2001 | Meijer et al. ............... 345/357 |
| 6,510,450 | B1 | * | 1/2003 | Ricart et al. ................ 709/203 |

* cited by examiner

Primary Examiner—Hosain T. Alam
Assistant Examiner—Jacques Veillard
(74) Attorney, Agent, or Firm—Phuong-Quan Hoang; Mark T. Starr; Lise A. Rode (57) ABSTRACT

A method in a computer system executing a repository program for dynamically linking two objects in two different models within the repository. The method includes the steps of receiving object identifiers of each of the two objects and an association name from a computer program using the method. The association name is then used to extract a namespace object from the repository program, wherein the namespace object is a part of the repository program for containing association names. Next, a determination is made as to whether or not an association already exists between either one of the two objects and the namespace object. If it is determined that no association exists, then the association name of a first of the two objects and the namespace are changed to an object identifier of a second of the two objects. Finally, the association name of the second of the two objects and the namespace are changed to an object identifier of the first of the two objects.

24 Claims, 9 Drawing Sheets

METHOD FOR DYNAMICALLY LINKING TWO OBJECTS IN TWO DIFFERENT MODELS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to an object-oriented method and system for modeling and in particular it relates to a method for associating objects in the same model or completely different models.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. Stated otherwise, a repository is like a card catalog that is found in the library, with the library being analogous to a database.

With the advent of repositories, accessibility of data within databases has improved. However, as these repositories become larger and more complex an improved method is required to support not only extensive object modeling in such a repository, but also associating classes between models.

In the prior art, associations between objects were defined by using linked lists. Linked lists have the disadvantage of requiring additional processing and memory resources. Creation of a linked list to associate objects in a repository is therefore a disadvantage.

Another disadvantage of the prior art is that any bi-directional association between objects in two different models requires changing those models and objects for constructing the association. This may not be desirable for reasons of loss of information contained in the model.

SUMMARY OF THE INVENTION

An object of this invention is to connect two objects in different models without modifying either object or model.

Another object of this invention is to provide a method for associating objects using a namespace, where the namespace is a service available for assigning unique names to objects in a repository.

Yet another object of this invention is to provide a method for associating an object to another object by storing the object identifier of the associated object in the namespace.

Another object of this invention is to increase the efficiency of processor and memory usage by defining and using namespaces for creating associations between objects stored in a repository.

A feature of this invention is that the association using a namespace allows bi-directional access of the objects associated using that namespace.

Another feature of this invention is that associations created between different objects can be constructed or deleted using the method of this invention.

An advantage of this invention is that since names in a namespace are indexed, faster look up of names is possible from the namespace thus enabling faster retrieval of associated objects.

These and other objects, which will become apparent as the invention is described in detail below, are provided by a method in a computer system executing a repository program for dynamically linking two objects in two different models within the repository. The method includes the steps of receiving object identifiers of each of the two objects and an association name from a computer program using the method. The association name is then used to extract a namespace object from the repository program, wherein the namespace object is a part of the repository program for containing association names. Next, a determination is made as to whether or not an association already exists between either one of the two objects and the namespace object. If it is determined that no association exists, then the association name of a first of the two objects and the namespace are changed to an object identifier of a second of the two objects. Finally, the association name of the second of the two objects and the namespace are changed to an object identifier of the first of the two objects.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
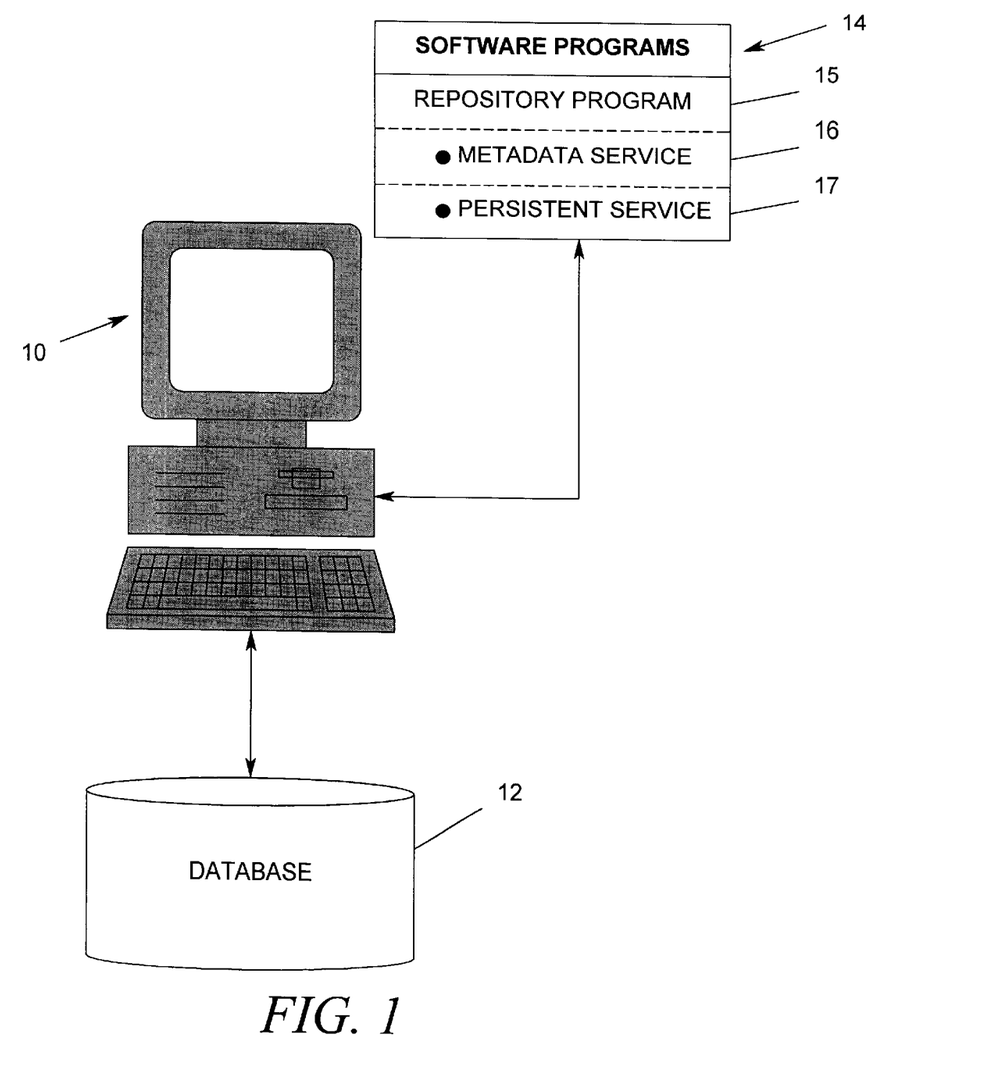
FIG. 1 is a block diagram of a computer system that may employ the present invention.

Referring now to FIG. 1, a block diagram of a system that may employ the present invention is shown. A computer 10 is shown coupled to a storage device 12, which in the illustrated embodiment contains a database. The computer 10 is capable of executing a variety of software programs 14, including a repository program 15 including a metadata service and a persistent service.

The repository program 15 is a specialized, extensible object-oriented database application that adds value to a database system, which allows customization of a particular domain (such as application development) and it may be the same as the repository program 15 depicted in FIG. 1. The repository program 15 is capable of accessing the database in the storage device 12 for obtaining modeling data stored therein.

The repository program 15 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No. 08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

The method of the present invention, which is an improvement to the repository program 15, provides a mechanism for representing a concept that is too large or complex to describe as a single entity. This mechanism includes modeling, which represents the concept as a set of components and the relationships between these components. Models are abstractions of real-world concepts such as ideas, objects or systems. Typically, models are used to describe, design and document systems such as a reservation system for an airline, a banking system or a patient-information system for a hospital. Information models represent the information processed or managed by enterprises. An information model represents an enterprise as a set of related components, called types, and the relationships among the types. The types provide templates defining the structure of the information and the services provided by the model. The information model of the present invention defines information that can be stored in the repository. It also identifies the services provided by the repository and the tool and technology models supported thereby.

Figure 2:
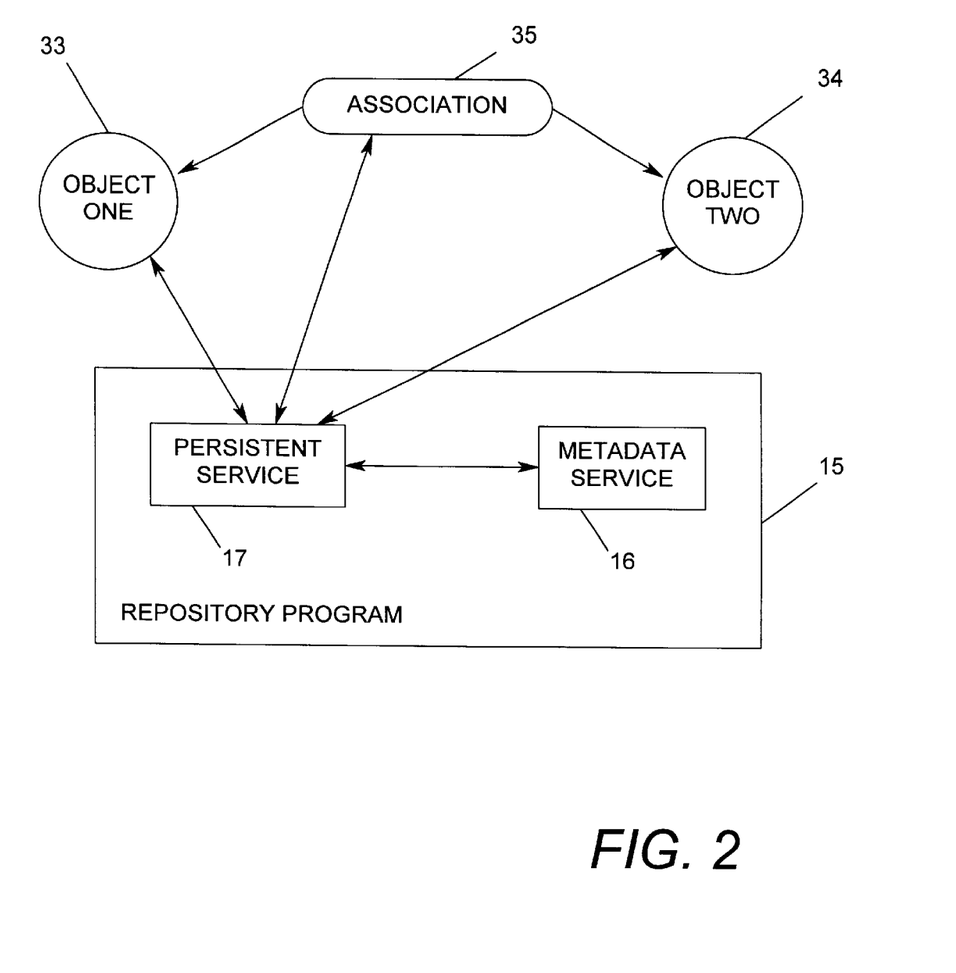
FIG. 2 is a chart illustrating the concept of association.

Referring now to FIG. 2, a chart illustrating the concept of association is shown. The repository program 15 is depicted as having a metadata service 16 and a persistent service 17. It is noted that the repository 15 contains many more services than what is illustrated herein. Refer to the above-cited patents and patent applications for a greater amplification of an exemplary repository, such as the program 14. Object One 33 and Object Two 34 are associated with one another by an association object 35. The term association, as used herein, means an object whose sole purpose is to describe the relationships between other objects. Such objects may or may not have their own properties or operations. If they do, they store information about the relationship between objects and not the objects themselves. Moreover, association object operations act upon the relationship or its state values and not on the state of the related objects.

Figure 3:
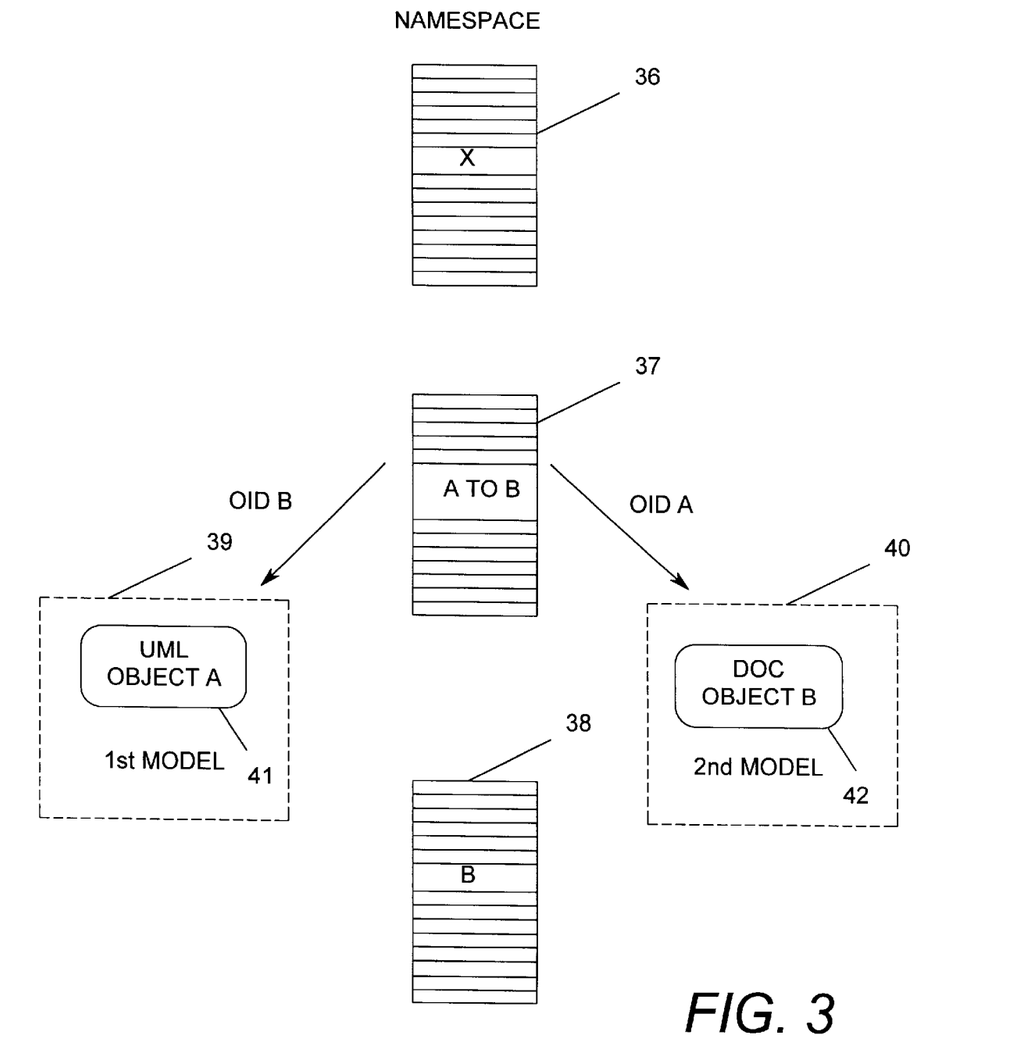
FIG. 3 is a block diagram to show the use of a namespace as an association between different objects belonging to disparate models.

Referring now to FIG. 3, a block diagram to illustrate the use of a namespace as an association between different objects belonging to disparate models. Three namespaces are shown by blocks 36, 37 and 38 to illustrate the concept of this invention. A namespace is a service of the Repository program that is disclosed in several patents and patent applications assigned to the assignee of this patent application and cited above. A namespace is a sub-class of the persistence service of the repository program, which implies that all objects in the repository will have a namespace associated with them. The namespace ensures that objects in the repository do not have duplicate names by maintaining a single valued association between each object in the repository and its associated namespace. This feature of the namespace service is used by the method of this invention to uniquely link objects that are a part of the same or disparate models in the-repository.

Referring to FIG. 3 again, blocks 39 and 41 represent the different object-oriented models that are a subject of this invention. As explained above, these models are abstractions of real-world concepts such as ideas, objects or systems. The method of this invention is applicable to models that are abstractions of similar or dissimilar ideas, objects or systems. For example, in FIG. 3, the first model (block 39) is a Unified Modeling Language (UML) based model, where UML is an OMG recognized standard in object-oriented computing. In contrast, the second model is a document model (block 40) wherein each object is a representation of particular documents that make up the system, idea or concept. Object A shown by block 41 is therefore a UML type object since it belongs to the first model and Object B, shown by block 42, is a document type object since it belongs to the second model. In order to link these two different objects belonging to two different models, this invention uses the namespace 37 to store the unique object identifiers of Object A and Object B. It is pointed out that each object in the repository has a unique object identifier. This object identifier can be used to retrieve a reference to that object using the persistence service of the repository. It should be noted that only one namespace is needed per association. This maintains the uniqueness of an association and enables faster and easier access of the associated objects.

However the method in which the identifiers are stored differentiates this invention from prior art. Given the object identifiers of the two objects to be associated, Object A and Object B and the name of the namespace containing the associations, this method stores the identifier of Object B as the name of the association between Object A and the namespace. Similarly, the identifier of Object A is stored as the name of the association between Object B and the namespace. The arrows in FIG. 3 from block 37 to blocks 39 and 40 represent associations between the namespace and the Objects to be associated. The labels of these arrows indicate that these associations are named in accordance with the method described above for associating the two objects. Also, it should be noted that while storing the identifiers of the objects in the namespace, there is no change necessary to either object or the models in which they are contained.

Figure 4A:
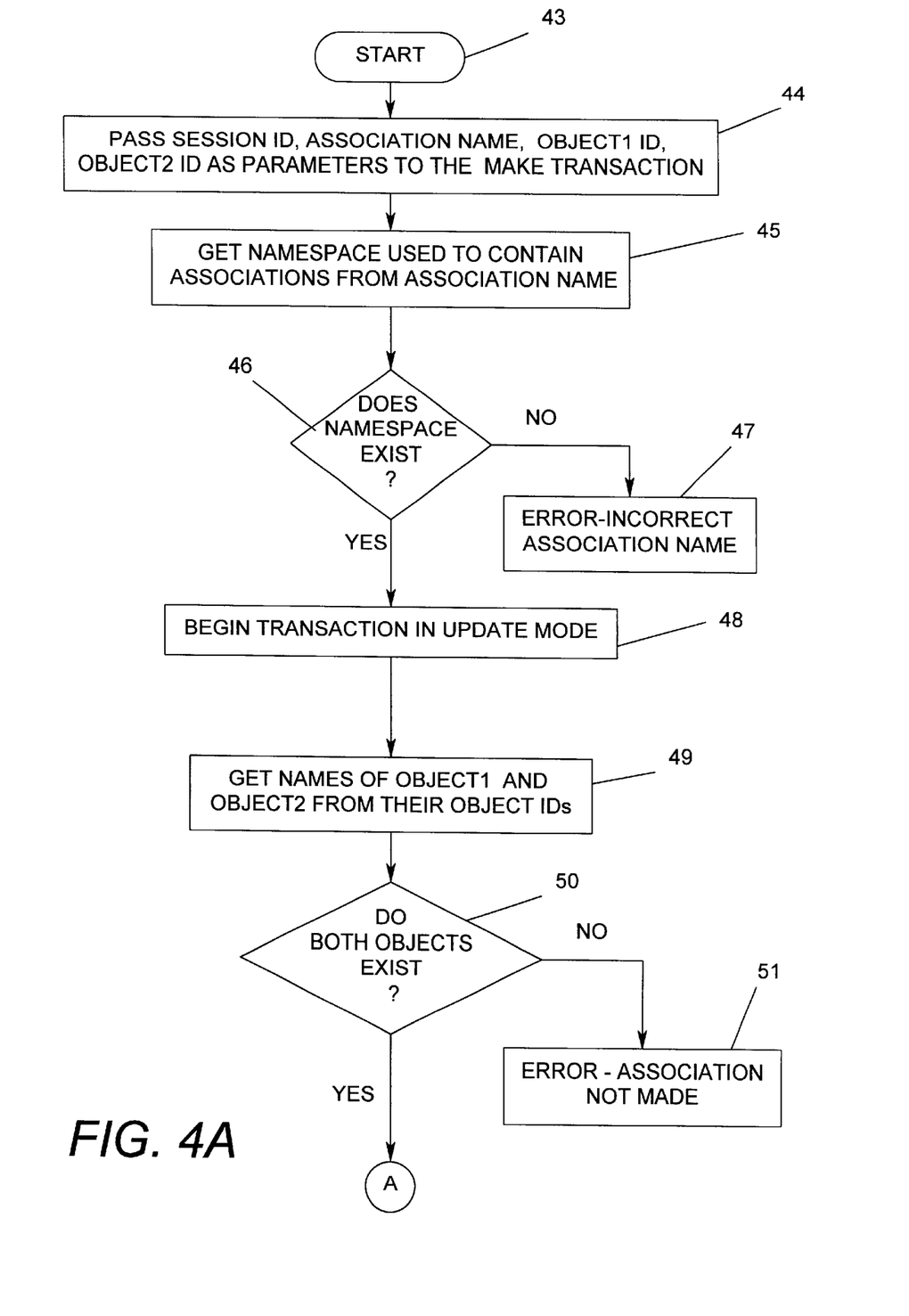
FIGS. 4A and 4B combined form a flowchart to illustrate the process of constructing an association between different objects using a namespace.

Referring now to FIG. 4A, a flowchart illustrating the process of constructing an association between different objects using a namespace is shown. This process is algorithmically represented as the make transaction that will be described herein-below. The process begins in a start bubble 43 followed by a step 44 of passing the parameters of session ID, Association name, Identifier of Object 1 and Identifier of Object 2 to the make transaction. These parameters uniquely specify the objects that need to be associated and the namespace for containing the association. Following this, the namespace containing the association is determined (block 45) from the association name passed in the previous step. Next, an inquiry 46 is made to determine whether or not the namespace exists. If the result of this inquiry is no, then the process ends with an error display (block 47) that the association name passed to the transaction was incorrect. On the other hand, if the result of this inquiry is yes, then the transaction begins in an update mode (block 48) which prevents any other transaction from accessing the objects and namespace passed to the make transaction until the transaction is complete.

Following this, names of Object 1 and Object 2 are obtained (block 49) from their object identifiers. This is done using API calls of the RSM model disclosed in patents and patent applications cited above. Next, an inquiry 50 is made to determine whether or not both objects exist. If the answer to the above inquiry is no, then the process ends in an error 51 displaying that the association between the specified objects could not be made. If, on the other hand, the answer to this inquiry is yes, then the process illustration continues in FIG. 4B as depicted by the connector A.

Figure 4B:
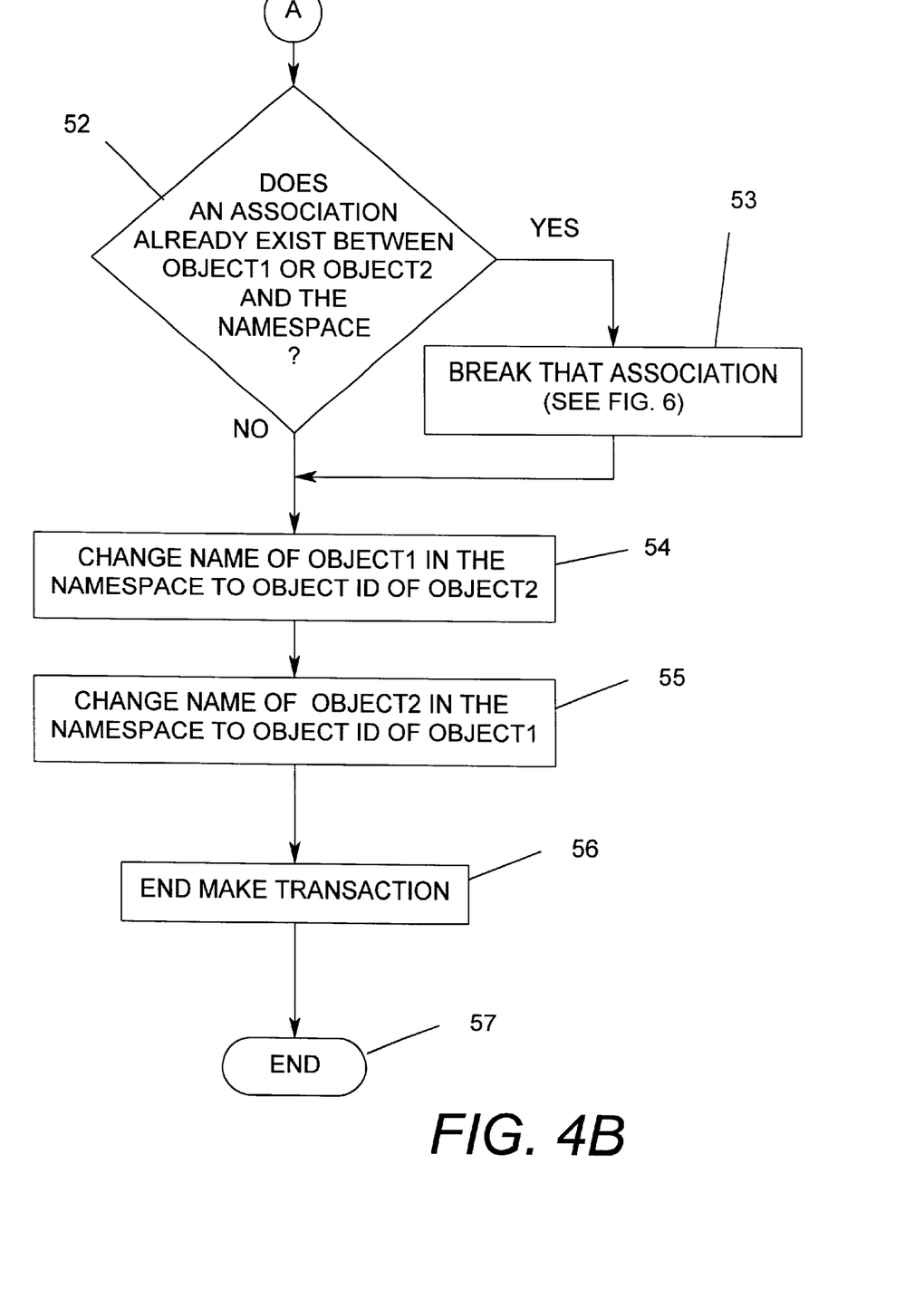

Referring now to FIG. 4B, at the connector A, another inquiry 52 is made to check if any previously made association already exists between Object1 or Object2 and the namespace. It is possible to uniquely determine this for each object because associations are always one-to-one within association names. If the result of this inquiry is yes, then a process (block 53), further illustrated in FIG. 6, breaks the association between the specified object and the namespace and the process continues as depicted by block 54. If on the other hand, the result of inquiry 52 is no, then the name of Object 1 in the specified namespace is changed (block 54) to the Object Identifier of Object 2. Also, the name of Object 2 in the namespace is changed (block 55) to the Object Identifier of Object 1. This completes the process of storing the identifier of an associated object as a given object's name in the namespace. Subsequently, the make transaction ends (block 56), releasing the objects and the namespace to be used by other transactions. Finally, the process ends in the end bubble 57.

Figure 5A:
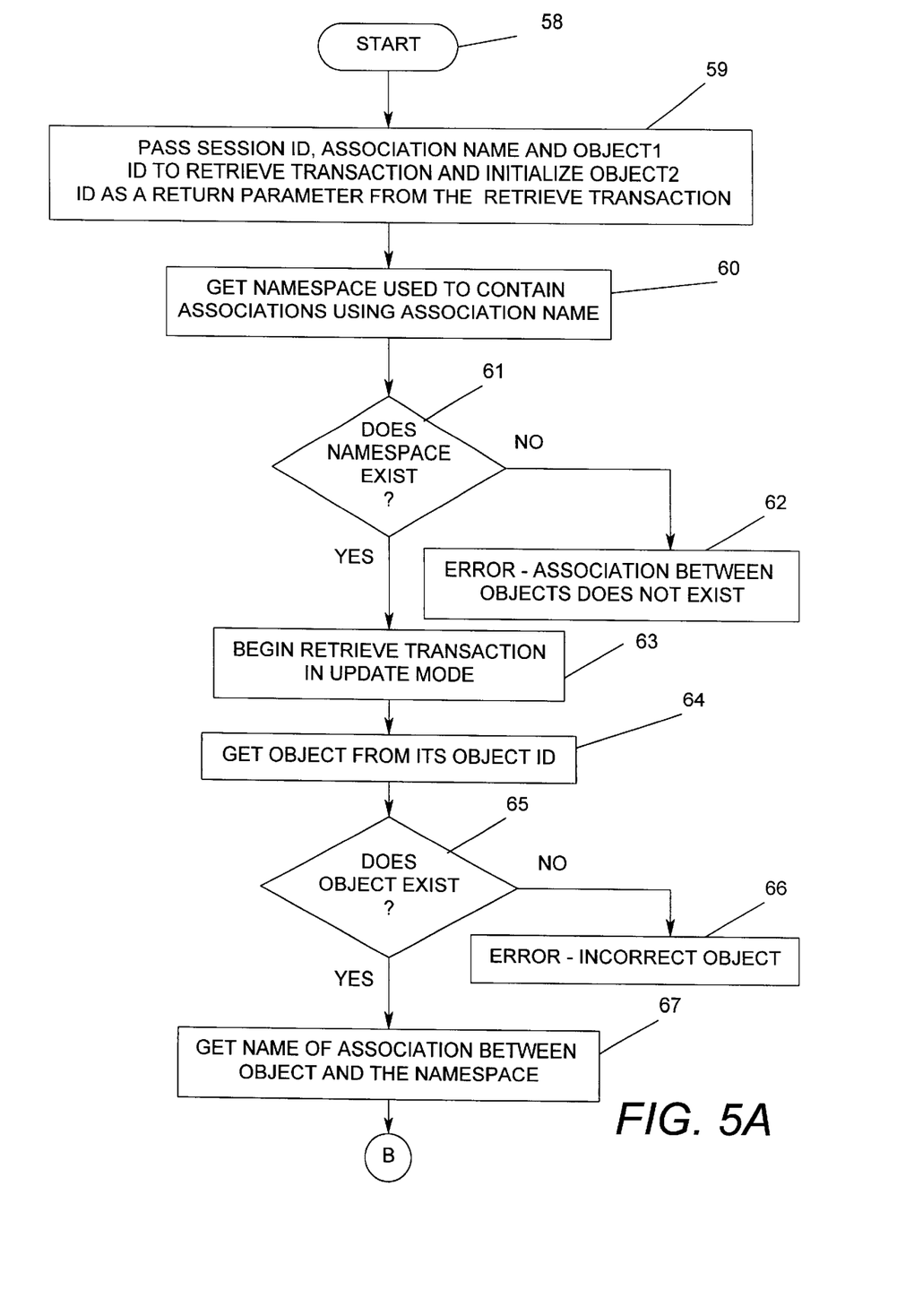
FIGS. 5A and 5B combined form a flowchart to illustrate the process of retrieving the object identifier of an associated object given the object identifier of any object.

Referring now to FIG. 5A, a flowchart illustrating the process for retrieving the object identifier of an associated object given the object identifier of any object is shown. This process is algorithmically represented as the retrieve transaction that will be described herein-below. The process begins with a start bubble 58 followed by a step (block 59) of passing the session ID, the association name, and the ID of a given object. Also initialized (block 59), as a return parameter from the retrieve transaction, is the object ID of an object associated with the given object.

Next, from the association name passed in the previous step, the namespace object containing associations is extracted (block 60). An inquiry 61 is made to determine whether or not the namespace exists. If the result of this inquiry is no, then an error is returned with a display that the given association does not exist. However, on the other hand, if the answer to this inquiry is yes, then the retrieve transaction is begun (block 63) in the update mode which restricts access to the objects passed to the transaction as parameters. Next, the name of the given object is extracted (block 64) using its ID passed as a parameter earlier in the process. This is done using API calls of the RSM model disclosed in the patents and patent applications cited above. An inquiry 65 is then made to determine whether or not the object exists. If the answer to this inquiry is no, then an error is returned along with a display that the object ID passed to the transaction was incorrect. If, on the other hand, the result of the inquiry 65 is yes, then the name of the association between the object and the namespace object is determined using API calls of the RSM model. The process then continues in FIG. 5B as depicted by the connector B.

Figure 5B:
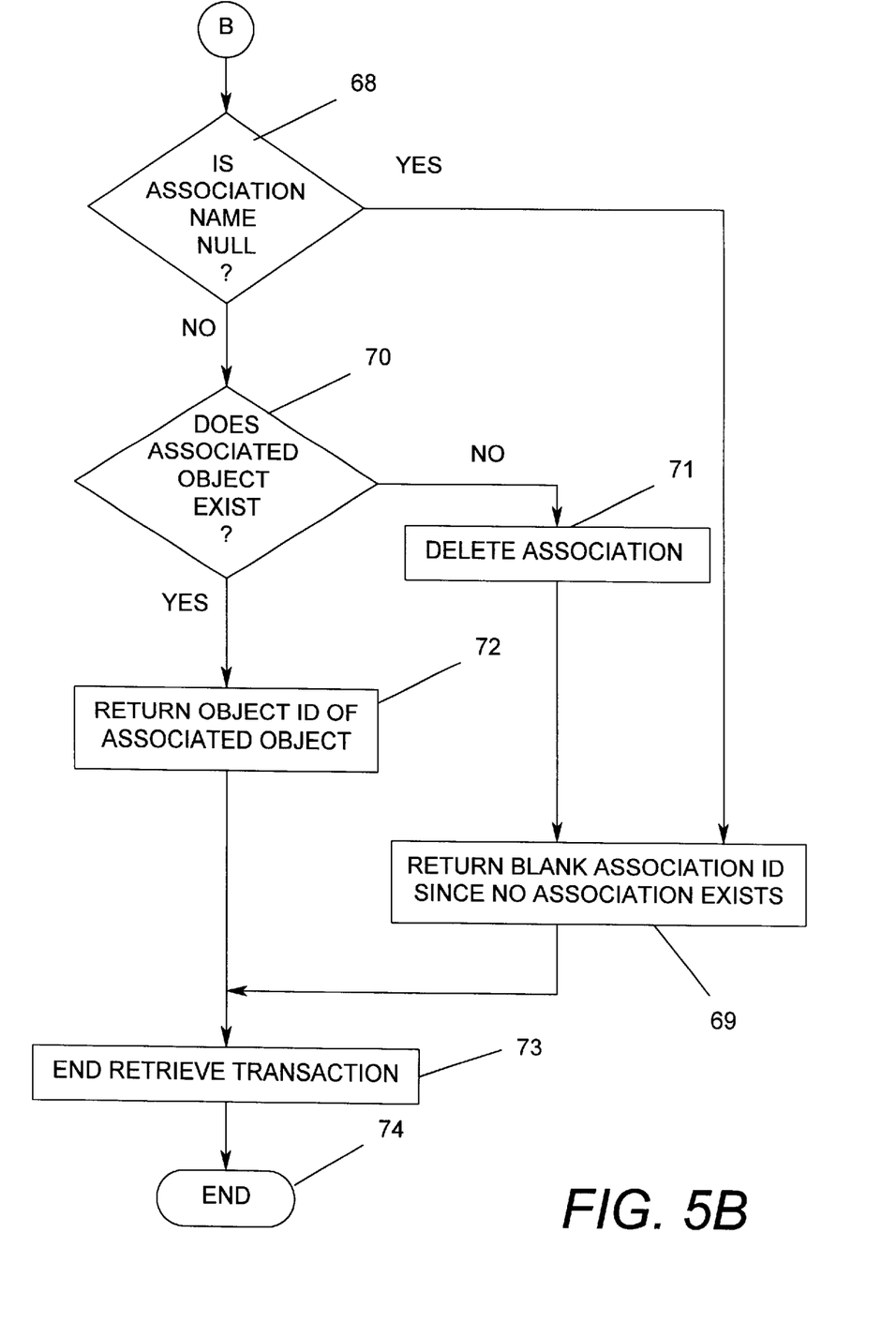

Referring now to FIG. 5B, at the connector B an inquiry 68 is made to determine if the association between the given object and the namespace object exists. If the answer to this inquiry is no, then a blank associated object ID is returned (block 69). On the other hand, if the answer to this inquiry is yes, then the name of the association between the given object and the namespace determines the ID of the associated object. An inquiry 70 is made to determine from the association name whether or not the associated object exists. If the answer to this inquiry is no, then the association between the given object and the namespace is deleted (block 71) and the process ends in the step depicted by block 69. If on the other hand the result of inquiry 70 is yes, then the object ID of the associated object is returned (block 72) from the retrieve transaction. The process from blocks 72 and 69 results in the termination (block 73) of the retrieve transaction thus freeing up the object resources to be used by other transactions and the process ends in the end bubble 74.

Figure 6:
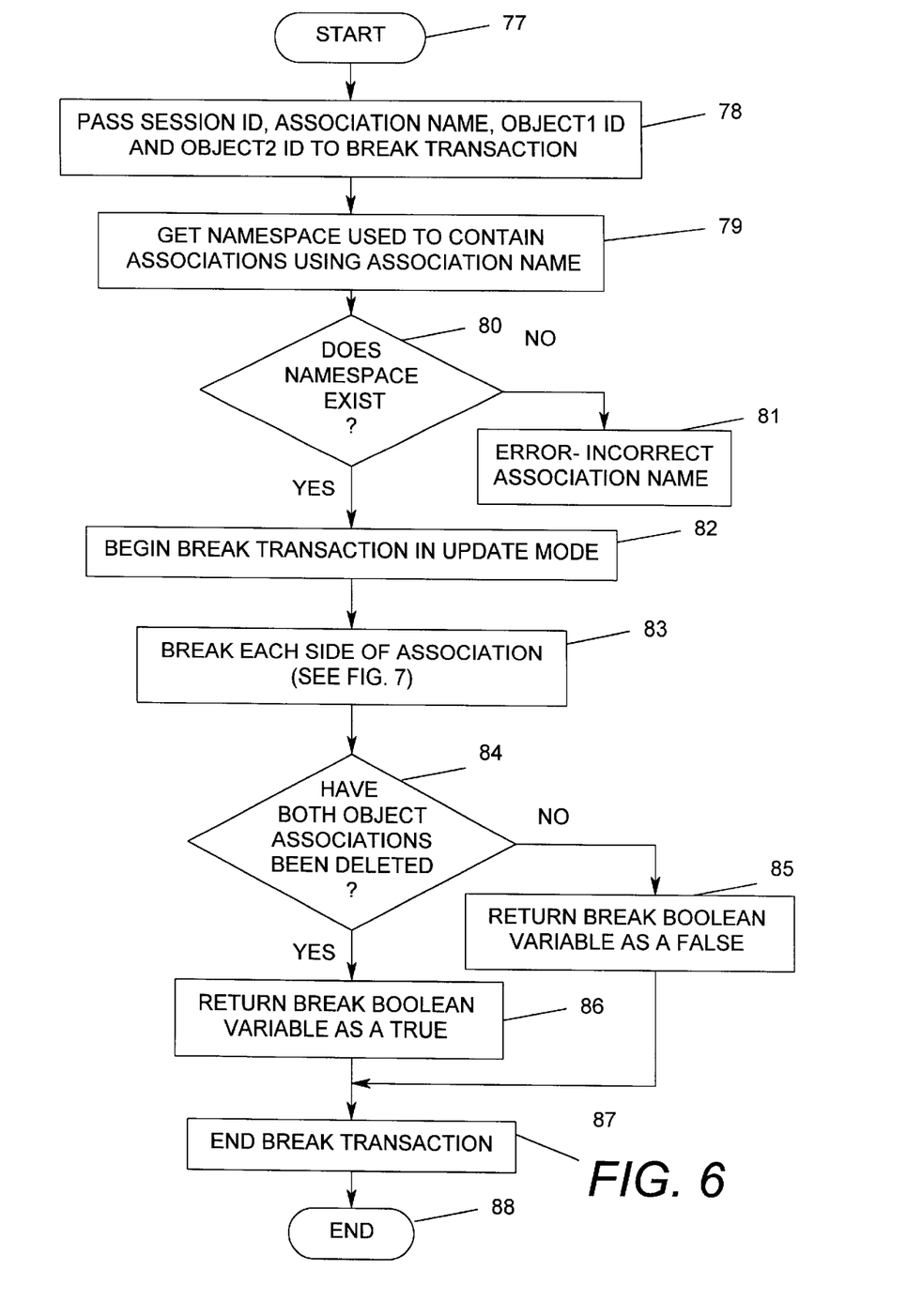
FIG. 6 is a flowchart to illustrate the overall process of breaking an association between associated objects.

Referring to FIG. 6, a flowchart to illustrate the overall process of breaking an association between associated objects is shown. The process is algorithmically represented as the break transaction that will be described herein below. The process begins with a start bubble 77 followed by a step (block 78) of passing the session ID, the association name, and the ID of the two associated objects to the break transaction.

Next, the namespace object is extracted (block 79) from the association name passed in the previous step using API calls of the RSM model. Following this an inquiry 80 is made to determine whether or not the namespace containing the specified association exists. If the result of this inquiry is no, then an error is returned along with a display that the given association ID was incorrect. If on the other hand, the result of the inquiry 80 is yes, then the process continues with a step (block 82) of beginning the break transaction in the update mode.

Figure 7:
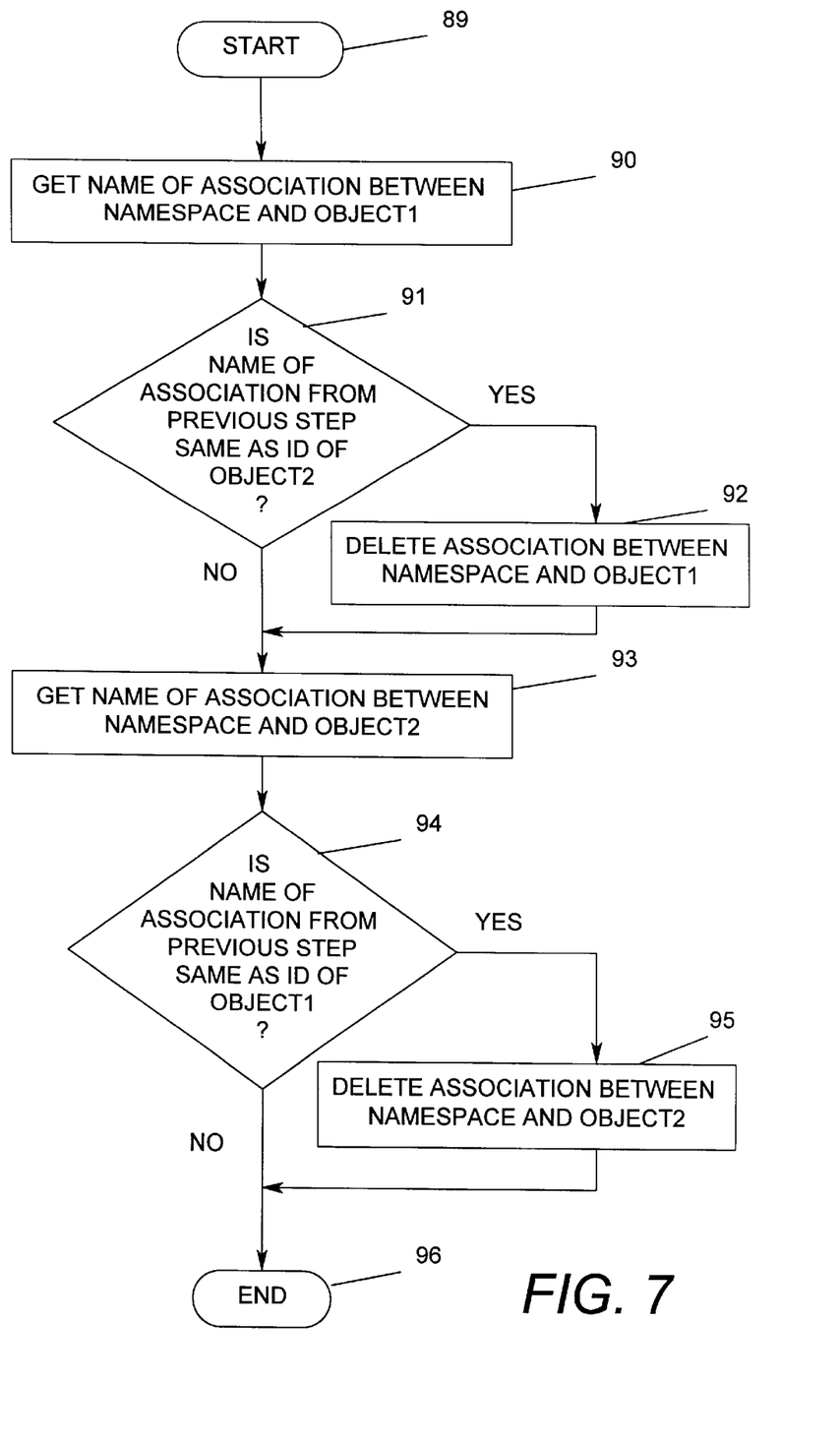
FIG. 7 is a flowchart to show the process of breaking an association on each side of the namespace containing associations in greater detail.

Next, each side of the association is broken (block 83) by a method illustrated in greater detail in FIG. 7. Following this an inquiry 84 is made to determine whether or not both object associations have been deleted. If the result of this inquiry is no, then the Boolean variable break is returned (block 85) as false and the break transaction terminates in block 87. If on the other hand, the result of the inquiry 84 is yes, then the Boolean variable break is returned as true and the break transaction terminates in block 87. Following block 87, the process ends in the end bubble 88.

Referring now to FIG. 7, a flowchart to further illustrate the process of breaking an association on each side of the namespace containing associations is shown. The parameters given to this process is the ID of the namespace and the ID of each of the two associated objects. The process begins with a start bubble 89 followed by a step (block 90) of determining the name of the association between the given namespace and a first of the two given objects. This is followed by a step of determining (diamond 91) whether or not the name of the association from the previous step is same as the ID of the second of the two given objects. If the answer to the above inquiry is yes, then the association between the specified namespace and the first object is deleted (block 92). If on the other hand, the answer to inquiry 91 is no, then, and also in continuation from block 92, the process continues in block 93.

Next, the name of the association between the given namespace and the second of the two given objects is determined (block 93). This is followed by a step of determining (diamond 94) whether or not the name of the association determined from the previous step is same as the ID of the first of the two given objects. If the answer to the above inquiry is yes, then the association between the specified namespace and the second object is deleted (block 95). If on the other hand, the answer to inquiry 94 is no, then, and also in continuation from block 95, the process ends in the end bubble 96. The steps of determining the name of an association (blocks 90 and 93) and deleting an association (blocks 92 and 95) are executed by calling API calls of the RSM model disclosed in the above cited patents and patent applications.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program, a method for dynamically linking two objects in two different models within said repository using a single namespace for associating said objects, said method comprising the steps of:
   a. receiving object identifiers of each of said two objects and an association name from a computer program using said method;
   b. using said association name to extract a namespace object from said repository program, wherein said namespace object is a part of said repository program for containing association names;
   c. determining if an association already exists between either one of said two objects and said namespace object, and if not;
   d. changing said association name of a first of said two objects and said namespace to an object identifier of a second of said two objects; and e. changing said association name of said second of said two objects and said namespace to an object identifier of said first of said two objects.

2. The method as in claim 1 further including validating whether or not said namespace exists, and if not, returning an error to the user.

3. The method as in claim 1 further including validating whether or not each of said two objects exists, and if not, returning an error to the user.

4. The method as in claim 1 where in step c thereof further including execution of a process for breaking said association if it is determined that an association already exists between either one of said two objects and said namespace object.

5. The method as in claim 4 further including passing said association name and object identifiers of each of said two objects to said process for breaking.

6. The method as in claim 5 further including the step of extracting from said repository program a namespace object corresponding to said association name.

7. The method as in claim 6 further including the step of validating whether or not said namespace object exists, and if not, returning an error to the user.

8. The method as in claim 7 wherein said namespace object does exist, further including the step of getting a name of the association between said namespace object and a first of said two objects.

9. The method as in claim 8 further including the step of determining if said name of said association is the same as said object identifier of a second of said two objects, and if so, deleting said association.

10. The method as in claim 7 wherein said namespace object does exist, further including the step of getting a name of the association between said namespace object and a second of said two objects.

11. The method as in claim 10 further including the step of determining if said name of said association is the same as said object identifier of a first of said two objects, and if so, deleting said association.

12. In a computer system executing a repository program, a method for retrieving an object identifier of a first object associated with a second object dynamically linked to said first object using a single namespace for associating said objects, said method comprising the steps of:
 a. receiving an object identifier of said second object and an association name therefor;
 b. using said association name to extract a namespace object from said repository program, wherein said namespace object is a part of said repository program for containing association names;
 c. getting an object corresponding to said object identifier of said second object;
 d. determining name of association between said namespace object and said second object;
 e. determining if name of said association is valid, and if so; and,
 f. storing said name of association as an object identifier of said first of said two objects.

13. The method as in claim 12 where in step e thereof, said association name is determined to be invalid, further including the step of storing a blank character as object identifier of said first of said two objects.

14. A storage medium encoded with machine-readable computer program code for dynamically linking two objects in two different models within a repository program being executed by a computer using a single namespace for associating said objects, wherein, when the computer program code is executed by the computer, the computer program code causes the computer to perform the steps of:
 a. receiving object identifiers of each of said two objects and an association name from a computer program using said method;
 b. using said association name to extract a namespace object from said repository program, wherein said namespace object is a part of said repository program for containing association names;
 c. determining if an association already exists between either one of said two objects and said namespace object, and if not;
 d. changing said association name of a first of said two objects and said namespace to an object identifier of a second of said two objects; and
 e. changing said association name of said second of said two objects and said namespace to an object identifier of said first of said two objects.

15. A storage medium as in claim 14 further including validating whether or not said namespace exists, and if not, returning an error to the user.

16. A storage medium as in claim 14 further including validating whether or not each of said two objects exists, and if not, returning an error to the user.

17. A storage medium as in claim 14 where in step c thereof further including execution of a process for breaking said association if it is determined that an association already exists between either one of said two objects and said namespace object.

18. A storage medium as in claim 17 further including passing said association name and object identifiers of each of said two objects to said process for breaking.

19. A storage medium as in claim 18 further including the step of extracting from said repository program a namespace object corresponding to said association name.

20. A storage medium as in claim 19 further including the step of validating whether or not said namespace object exists, and if not, returning an error to the user.

21. A storage medium as in claim 20 wherein said namespace object does exist, further including the step of getting a name of the association between said namespace object and a first of said two objects.

22. A storage medium as in claim 21 further including the step of determining if said name of said association is the same as said object identifier of a second of said two objects, and if so, deleting said association.

23. A storage medium as in claim 20 wherein said namespace object does exist, further including the step of getting a name of the association between said namespace object and a second of said two objects.

24. A storage medium as in claim 23 further including the step of determining if said name of said association is the same as said object identifier of a first of said two objects, and if so, deleting said association.

* * * * *